United States Patent
Tan et al.

(10) Patent No.: US 9,419,891 B2
(45) Date of Patent: Aug. 16, 2016

(54) VIRTUAL PRIVATE NETWORK COMMUNICATION SYSTEM, ROUTING DEVICE AND METHOD THEREOF

(71) Applicant: Gemtek Technology Co., Ltd., Hsinchu (TW)

(72) Inventors: Der-Hwa Tan, Hsinchu (TW); Ming-Yen Lai, Hsinchu (TW); Min-Wei Huang, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 300 days.

(21) Appl. No.: 13/802,820

(22) Filed: Mar. 14, 2013

(65) Prior Publication Data
US 2014/0207958 A1  Jul. 24, 2014

(30) Foreign Application Priority Data
Jan. 18, 2013 (TW) .............................. 102102047 A

(51) Int. Cl.
| | | |
|---|---|---|
| G06F 15/16 | (2006.01) | |
| H04L 12/717 | (2013.01) | |
| H04L 29/08 | (2006.01) | |
| H04L 12/46 | (2006.01) | |
| H04L 12/721 | (2013.01) | |

(52) U.S. Cl.
CPC ............ *H04L 45/42* (2013.01); *H04L 12/4641* (2013.01); *H04L 67/1074* (2013.01); *H04L 67/327* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 2004/0006708 A1* | 1/2004 | Mukherjee et al. | ........... 713/201 |
| 2007/0115985 A1* | 5/2007 | Choudhury | ......... H04L 12/4641 370/392 |
| 2014/0101324 A1* | 4/2014 | Young et al. | .................. 709/228 |
| 2014/0115325 A1* | 4/2014 | Detienne et al. | .............. 713/160 |

FOREIGN PATENT DOCUMENTS

| | | |
|---|---|---|
| CN | 1567873 | 1/2005 |
| TW | I302794 | 11/2008 |

OTHER PUBLICATIONS

"Office Action of Taiwan Counterpart Application", issued on Jan. 23, 2015, p. 1-p. 10.

* cited by examiner

*Primary Examiner* — Ryan Jakovac
(74) *Attorney, Agent, or Firm* — Jianq Chyun IP Office

(57) ABSTRACT

A virtual private network communication system, a routing device and a method thereof are provided. The system includes a server and a plurality of routing devices. The routing devices respectively transmit registration information to the server, wherein the registration information includes a recognition string. The routing devices include a first routing device and a second routing device. The first routing device transmits a positioning request to the server, and the server transmits the positioning request to a part of or all of the routing devices according to the recognition string. When the second routing device receives the positioning request, the second routing device transmits positioning information according to the positioning request to the first routing device via the server. The first routing device directly establishes a connection with the second routing device according to the positioning information and transmits data after the connection is established.

20 Claims, 4 Drawing Sheets

VIRTUAL PRIVATE NETWORK COMMUNICATION SYSTEM, ROUTING DEVICE AND METHOD THEREOF

CROSS-REFERENCE TO RELATED APPLICATION

This application claims the priority benefit of Taiwan application serial no. 102102047, filed on Jan. 18, 2013. The entirety of the above-mentioned patent application is hereby incorporated by reference herein and made a part of this specification.

BACKGROUND OF THE INVENTION

1. Field of the Invention

The invention relates to an Internet communication system and particularly relates to a virtual private network communication system, a routing device, and a method thereof.

2. Description of Related Art

As the Internet thrives rapidly, under the framework of Internet Protocol Version 4 (IPv4), public Internet protocol addresses (Public IP addresses) are becoming insufficient for the fast growing number of network users. After the concept of private network or enterprise Intranet is proposed, private network is now extensively used by many organizations.

The Request for Comments (RFC) No. 1918 issued by the Internet Engineering Task Force (IETF) provides explanations to define the private network and the configuration of virtual IP under the private network. Basically, a host provided with a virtual IP in the private network may be connected to an external service by means of a gateway, etc.; however, the host does not have IP-level connectivity to an external network address.

When a host in a private network is to be connected to a computer host in the Internet, the connection can be achieved by the mechanism of NAT address translation. Nevertheless, when another host, to which this host in the private network is to be connected, is in another private network, a framework of virtual private network (VPN) is required between the two private networks, so as to transmit messages between the two private networks via the Internet. The virtual private network utilizes an encrypted tunneling protocol to achieve the security effects, e.g. confidentiality, transmission terminal verification, message accuracy, for private messages, such that the messages in the private networks would not be acquired by an external host/user. However, according to the current method of establishing tunneling protocol, the aforementioned has to go through complicated connection and setting. Therefore, how to establish connection between virtual private networks in a simpler way and at the same time maintain the security of the transmitted messages is an important issue in this field.

SUMMARY OF THE INVENTION

The invention provides a virtual private network communication system, a routing device, and a method thereof for hosts belonging to different private networks to perform network communication directly by a simple connection method.

The invention provides a virtual private network communication system that includes a server and a plurality of routing devices. The routing devices respectively transmit registration information to the server, wherein the registration information includes a recognition string. The routing devices include a first routing device and a second routing device. The first routing device transmits a positioning request to the server, and the server transmits the positioning request to a part of or all of the routing devices according to the recognition string. When the second routing device receives the positioning request, the second routing device transmits positioning information according to the positioning request to the first routing device via the server. The first routing device directly establishes a connection with the second routing device according to the positioning information and transmits data after the connection is established.

The invention provides a routing device adapted for a virtual private network communication system, and the routing device includes: a network interface unit and a processing unit. The network interface unit is connected to a server via the Internet. The processing unit is coupled to the network interface unit and transmits registration information to the server via the network interface unit, wherein the registration information includes a recognition string. The processing unit further transmits a positioning request to the server via the network interface unit. The processing unit receives positioning information from the server via the network interface unit, and the processing unit directly connects to a remote routing device via the network interface unit according to the positioning information and transmits data after the connection is established.

The invention provides a virtual private network communication method that includes the following steps. First, registration information is transmitted to a server in the virtual private network communication system, wherein the registration information includes a recognition string. Next, a positioning request is transmitted to the server. Then, positioning information is received from the server, and a remote routing device is directly connected according to the positioning information. Thereafter, data is transmitted after the connection is established.

Based on the above, the invention provides a virtual private network communication system, a routing device, and a method thereof, which utilize the positioning request and the recognition string for registration in the server and then use the server to exchange positioning information, so as to achieve communication between the private networks and establish connection, thereby achieving the virtual private network.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
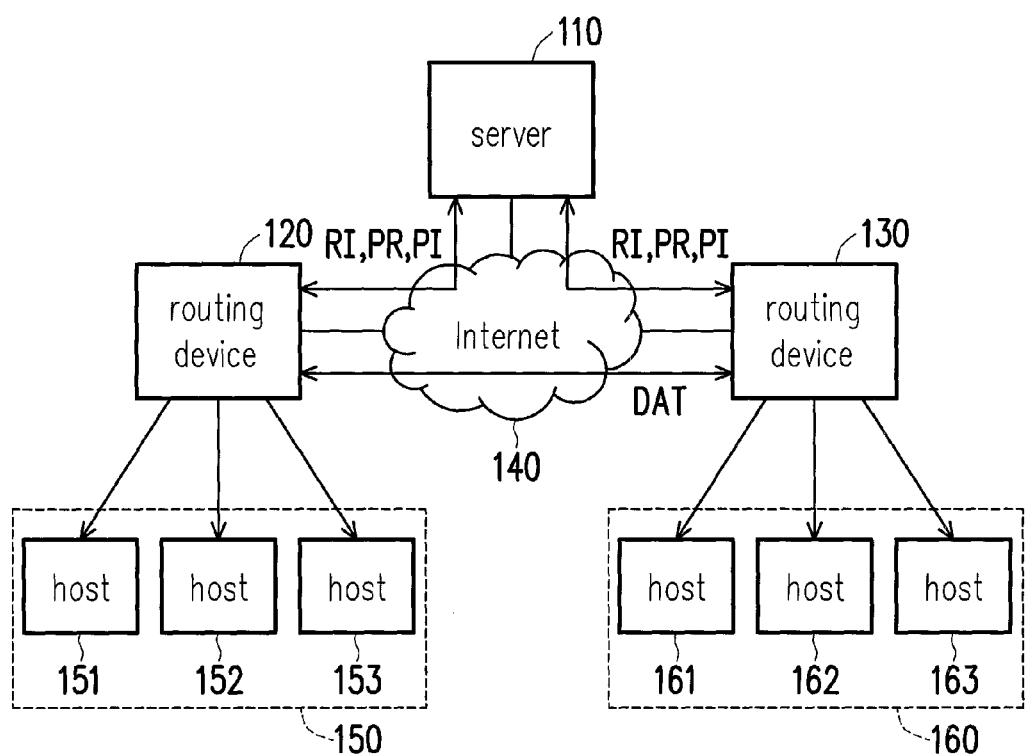
FIG. 1 is a block diagram of a virtual private network communication system according to an embodiment of the invention.

FIG. 1 is a block diagram of a virtual private network (VPN) communication system according to an embodiment of the invention. Referring to FIG. 1, a virtual private network communication system 10 includes a server 110 and routing devices 120 and 130. In fact, the virtual private network communication system 10 may include a plurality of routing devices. To make the disclosure more comprehensible, in this embodiment, only the routing devices 120 and 130 are illustrated as example.

The routing devices 120 and 130 respectively function as doorways of private networks 150 and 160 to an Internet 140 outside and provide services, e.g. network address translation (NAT), to each host in the private networks 150 and 160. For example, the private network 150 includes hosts 151-153 therein, and the routing device 120 disposes a virtual Internet protocol address in a virtual subnet to the hosts 151-153 respectively. When connecting the hosts 151-153 to the Internet 140 via the routing device 120, the routing device 120 uses the network address translation service to transit the virtual Internet protocol address in the virtual subnet to a physical address in the Internet and thereby receive and forward transmission data of each host (hosts 151-153) in the private network 150.

The relationship between the routing device 130 and the private network 160 is the same as the relationship between the routing device 120 and the private network 150 and thus will be omitted hereinafter.

The routing devices 120 and 130 serve as the doorways for the private networks 150 and 160 and usually provide the NAT service, or equipment having the NAT service may exist between the routing devices 120 and 130 and the Internet. Therefore, it becomes more difficult to convert the private networks 150 and 160 into virtual private networks (VPN). Accordingly, the invention provides a simpler way to establish a virtual private network communication system between the private networks and, through the mechanism of the virtual private network communication system, enables the hosts of the private networks to perform peer to peer transmission.

In an embodiment of the invention, the routing devices 120 and 130 are connected with each other via the Internet 140 and the server 110 and respectively transmit registration information RI to the server 110, wherein the registration information RI includes a recognition string. Herein, the server 110 utilizes the recognition string to determine whether to combine the private networks 150 and 160, to which the routing devices 120 and 130 belong, into a virtual private network.

After the server 110 receives and records the registration information RI respectively transmitted by multiple routing devices, the routing device 120 sends a positioning request PR to the server 110. The server 110 transmits the positioning request PR to a part of or all of the routing devices (e.g. the routing device 130) according to the recognition string. When one of the routing devices, e.g. the routing device 130, receives the positioning request PR, the routing device 130 transmits positioning information PI to the routing device 120 via the server 110 according to the positioning request PR. The routing device 120 directly establishes a connection with the routing device 130 according to the positioning information PI and transmits data DAT after the connection is established. To explain the disclosure in further detail, several embodiments are described below with reference to accompany the drawings.

Figure 2:
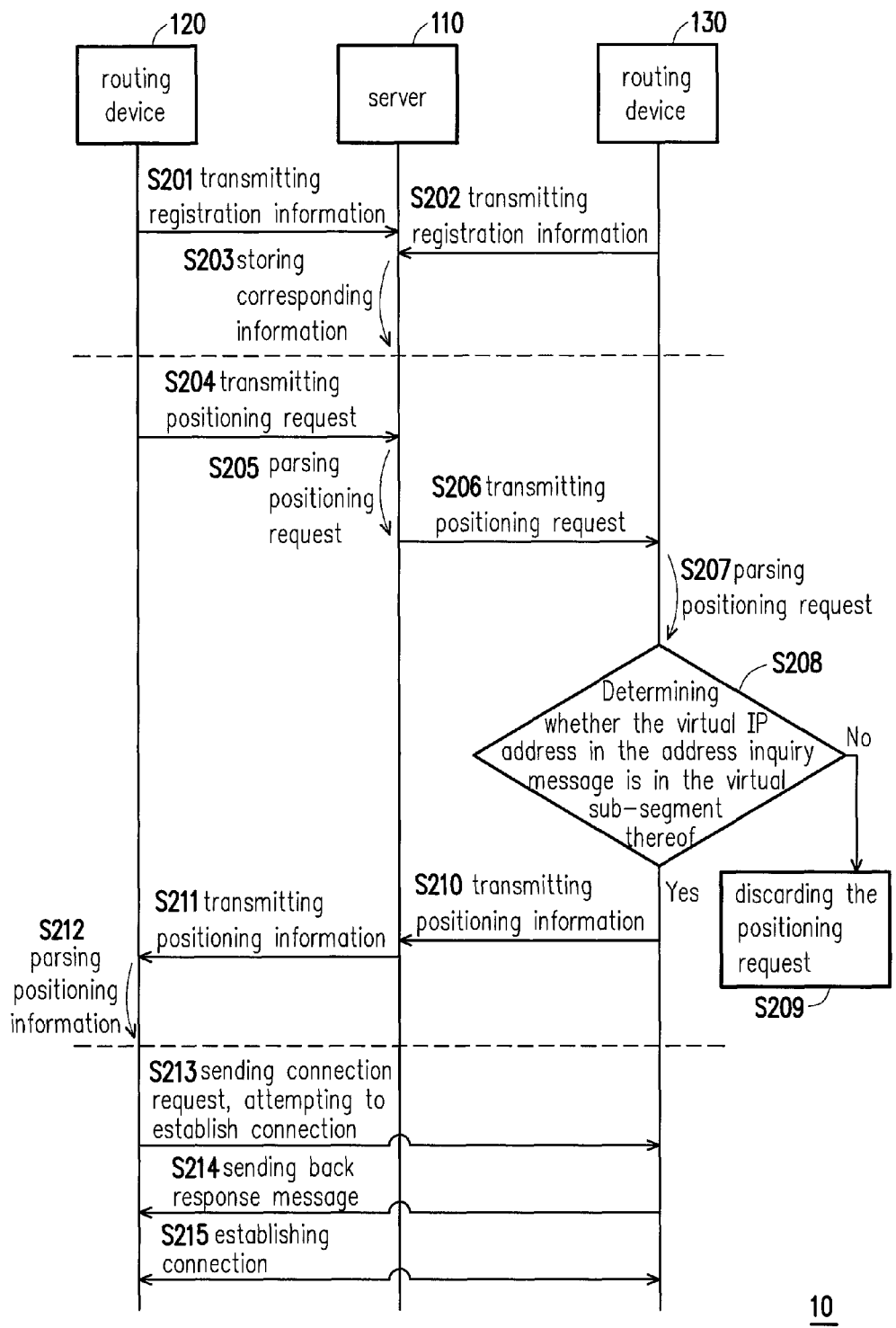
FIG. 2 is a timing flowchart of a virtual private network communication system according to an embodiment of the invention.

FIG. 2 is a timing flowchart of a virtual private network communication system according to an embodiment of the invention. Referring to FIG. 2, the timing flowchart of the virtual private network communication system 10 may be divided into three main parts, wherein the first part is a registration procedure corresponding to Steps S201-S203, the second part is a positioning procedure corresponding to Steps S204-S212, and the third part is a connection procedure corresponding to Steps S213-S215.

First, in the registration procedure of the first part, each of the routing devices, e.g. the routing devices 120 and 130, in the virtual private network communication system transmits registration information to the server 110 (Steps S201 and S202). The registration information includes a recognition string, a media access control (MAC) address of the routing device, and a MAC address of the server 110. Each of the routing devices transmits the registration information to the server 110 according to the MAC address of the server 110. After receiving the registration information transmitted from each of the routing devices, the server 110 stores a name, the recognition string, and the MAC address of each of the routing devices in a registration form (Step S203).

The server 110 may be used to process several virtual private networks at the same time and may utilize the recognition strings to determine whether the routing devices in the virtual private network communication system 10 belong to different virtual private networks. If the registration information RI transmitted by several routing devices (for example the routing devices 120 and 130) includes the same recognition string, the server 110 determines that these routing devices having the same recognition string belong to the same virtual private network. Accordingly, the steps of the second part are executed.

The positioning procedure of the second part is executed after the registration procedure is completed. Referring to FIG. 2, the routing device 120 transmits a positioning request to the server 110 (Step S204). Before transmitting the positioning request, the routing device 120 may receive a connection request from one of the hosts (e.g. one of the hosts 151-153 shown in FIG. 1) in the private network thereof (e.g. the private network 150 shown in FIG. 1), which requests to connect with one host in another private network (e.g. one of the hosts 161-163 in the private network 160), and the routing device 120 transmits the positioning request to the server 110 responsive to the connection request.

Figure 3:
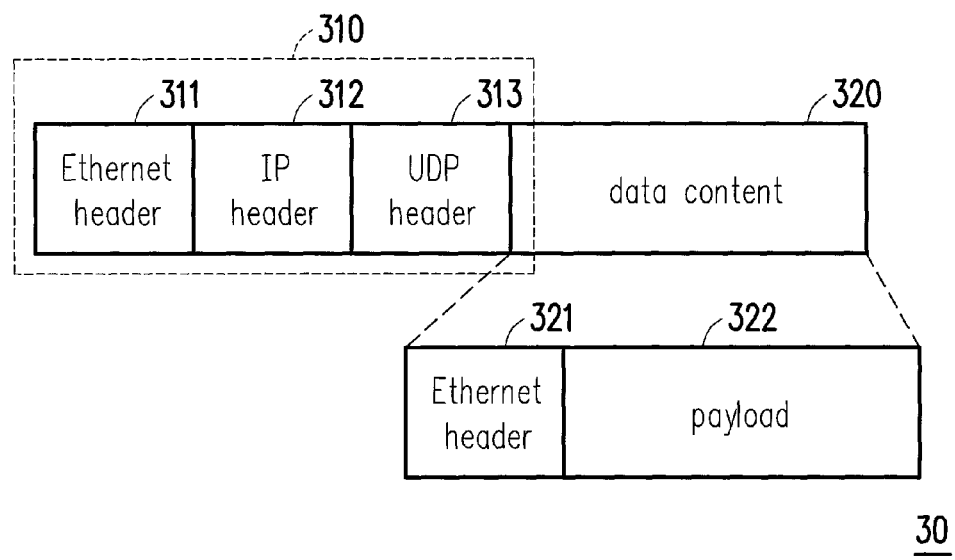
FIG. 3 is a data structure diagram of a positioning request according to an embodiment of the invention.

FIG. 3 is a data structure diagram of the positioning request according to an embodiment of the invention. Referring to FIG. 3, a positioning request 30 includes a header 310 and a data content 320. Specifically, the header 310 includes an Ethernet header 311, an Internet protocol (IP) header 312, and a user datagram protocol (UDP) header 313 for transmitting the positioning request 30 from the routing device 120 to the server 110 via the Internet. It should be noted that, in this embodiment, the positioning request 30 utilizes a transport layer protocol of UDP considering the advantages of simplicity and quickness. However, the invention is not limited thereto, and other protocols such as transmission control protocol (TCP) may be used.

The data content 320 includes an Ethernet header 321 and a payload 322. It is noticed that, generally speaking, the content recorded in the Ethernet header 321 includes a MAC address of a previous object of the transmission (e.g. a node in the network) and a MAC address of a next object to which the packet is to be transmitted. The MAC addresses in the Ethernet header 321 of the data content 320 include a MAC address of a transmitter (e.g. the routing device 120) and a MAC address of the last receiver (e.g. the server 110). The last receiver of the positioning request 30 transmitted by the routing device 120 is the server 110. Thus, when the server 110 receives the positioning request 30, the server 110 can process the header 310 and determine from the Ethernet header 321 that the last receiver of the positioning request 30 is the server 110, and further interpret the data content.

The payload 322 in the data content includes a recognition string and an address inquiry message. The recognition string may be used to make the server 110 reconfirm the virtual private network to which the routing device 120 belongs. The address inquiry message is an encrypted message and includes a virtual IP address, which is the virtual IP address of the object that is to be connected. The virtual IP address is included in the connection request received by the routing device 120 and transmitted by the host (one of the hosts 151-153) of the private network 150. In this embodiment, the address inquiry message before encryption is written in accordance with an address resolution protocol (ARP) format, so as to be parsed by the recipient routing device, e.g. the routing device 130. In an embodiment where the invention is applied to Internet Protocol version 6 (IPv6), the address inquiry message may be written in accordance with an Internet control message protocol version 6 (ICMPv6) format under IPv6. However, it is noted that the invention is not limited to the above.

In addition, in this embodiment, the routing device 120 uses the recognition string as a key to encrypt the address inquiry message. In other embodiments of the invention, the key may be generated using a specific algorithm based on the recognition string or other information common to the routing devices and the server. However, it is noted that the invention is not limited to the above.

Further referring to FIG. 2, the server 110 parses the positioning request after receiving the positioning request, so as to verify the Ethernet header 321 and the content in the recognition string of the payload 322 (Step S205). In this embodiment, the server 110 directly forwards the positioning request to all the routing devices of the virtual private network, i.e. all the routing devices in the registration form, which have the same recognition string as the positioning request or the routing device 120.

It should be noted that here the Ethernet header 321 of the data content 320 in the positioning request 30 is rewritten by the server 110. The last receiver of the Ethernet header 321 is rewritten as the aforementioned routing devices that have the same recognition string by the server 110, and the position of the transmitter remains to be the transmitter of the positioning request, i.e. the routing device 120. After rewriting the Ethernet header 321 in the data content 320 for each of the routing devices, the server 110 respectively transmits the positioning request to each of the routing devices in the virtual private network by unicast (Step S206).

In fact, the aforementioned unicast is similar to a broadcast operation that the server 110 performs to all the routing devices having the same recognition string. However, since the contents transmitted to different routing devices vary slightly, the broadcast operation varies as well. In the virtual private network communication system 10, after the routing devices having the same recognition string as the routing device 120 receive the positioning request, the routing devices parse the positioning request to decrypt the address inquiry message therein (Step S207). Next, the routing devices verify whether the virtual IP address in the address inquiry message is in the virtual subnet of the private network thereof (Step S208). If one routing device determines that the virtual IP address in the address inquiry message is not in the virtual subnet of the private network thereof, the routing device discards/ignores the positioning request directly (Step S209).

In this embodiment, the virtual IP address included in the address inquiry message is the virtual IP address of one of the hosts 161-163 in the private network 160, to which the routing device 130 belongs. Therefore, the routing device 130 determines that the virtual IP address in the address inquiry message is in the virtual subnet of the private network thereof. Here, the routing device 130 may acquire the MAC address of the transmitter of the positioning request, i.e. the routing device 120, from the Ethernet header 321 of the data content 320 of the positioning request. Accordingly, the routing device 130 transmits positioning information to the routing device 120 via the server 110 (Steps S210 and S211).

The data structure of the positioning information is the same as the data structure of the positioning request, as illustrated in FIG. 3. The routing device 130 fills the MAC address of the routing device 120 in a field of receiver in the Ethernet header of the data content of the positioning information. Thus, the server 110 may directly determine that the positioning information needs to be forwarded to the routing device 120 according to the Ethernet header of the data content when receiving the positioning information.

In addition to the Ethernet header, the data content of the positioning information further includes an encrypted positioning message, which includes a description indicating that the virtual IP address is in the virtual subnet of the private network 160 of the routing device 130. A method for encrypting the positioning message and a data format thereof are similar to those of the address inquiry message and thus will not be repeated hereinafter.

After receiving the positioning information, the routing device 120 parses the positioning information and decrypts the positioning message in the positioning information to acquire a private network portal, i.e. the routing device 130, corresponding to the virtual IP address in the positioning request (Step S212). Accordingly, the virtual private network communication system 10 completes the positioning procedure of the second part.

After the routing device 120 acquires the positioning information of the object that is to be connected, the connection procedure of the third part is performed. First, the routing device 120 directly transmits a connection request to the routing device 130 according to the content of the positioning information, so as to establish the connection (Step S213). After receiving the connection request, the routing device 130 verifies the connection request and responds to the connection request by sending back a response message to the routing device 120 (Step S214). Accordingly, the routing device 120 establishes the connection with the routing device 130 (Step S215). It should be noted that the connection established between the routing devices 120 and 130 is a peer to peer (P2P) connection conforming to the Internet Protocol Security (IPSec), such that the private networks 150 and 160, to which the routing devices 120 and 130 belong, can combine into one virtual private network.

In order to explain the technical content of the invention in further detail, an actual embodiment is described below to exemplify the procedures and steps performed by the aforementioned virtual private network communication system. In this actual embodiment, the MAC addresses of the devices in the virtual private network communication system are set as shown in the following tables.

TABLE 1

Devices and MAC addresses thereof in the system

| Name of device | MAC address |
| --- | --- |
| Server 110 | ff:ff:ff:ff:ff:ff |
| Routing device 120 | 42:21:1a:f4:ea:27 |
| Routing device 130 | 00:ff:7f:0a:81:6d |

First, in the registration procedure of the first part, the data content in the registration information that the routing device 120 transmits to the server 110 includes:

{42:21:1a:f4:ea:27, ff:ff:ff:ff:ff:ff,SMB}

The first two are Ethernet headers, which are the MAC addresses of the routing device 120 (transmitter) and the server 110 (receiver). The third information is a recognition string SMB.

Likewise, the data content in the registration information that the routing device 130 transmits to the server includes:

{00:ff:7f:0a:81:6d, ff:ff:ff:ff:ff:ff,SMB}

After receiving the registration information, the server 110 records the data content of the registration information in the registration form as shown below:

TABLE 2

Registration form of the server

| Name of device | Recognition String | MAC address |
| --- | --- | --- |
| Routing device 120 | SMB | 42:21:1a:f4:ea:27 |
| Routing device 130 | SMB | 00:ff:7f:0a:81:6d |

It should be noted that the field of "Name of device" may be selectively implemented and may be attached to the registration information for transmission.

Next, in the positioning procedure of the second part, the routing device 120 transmits a positioning request, as shown below:

{42:21:1a:f4:ea:27, ff:ff:ff:ff:ff:ff, SMB, encrypted message (ARP: who is 10.2.3.100)}

The fourth information is the encrypted address inquiry message.

After receiving the aforementioned positioning request, the server 110 forwards the positioning request to other routing devices, i.e. the routing device 130 in this embodiment, having the same recognition string "SMB" in the virtual private network communication system 10.

{42:21:1 a:f4:ea:27, 00:ff:7f:0a:81:6d, SMB, encrypted message (ARP who is 10.2.3.100)}

It should be noted that the MAC address of the receiver of the second information has been rewritten into the MAC address of the routing device 130.

The routing device 130 also has a connection list stored therein, and after parsing the positioning request, the routing device 130 also stores a connection method of the routing device 120 in the connection list:

TABLE 3

Connection list of routing device 130

| Device | UDP connection method |
| --- | --- |
| ff:ff:ff:ff:ff:ff | Sock0(server) |
| 42:21:1a:f4:ea:27 | Sock0 |

The UDP connection method Sock0 indicates that in this stage, the routing device 120 can transmit various data to the routing device 130 through connection with the server.

Because the virtual IP address 10.2.3.100 in the address inquiry message is in the virtual subnet of the routing device 130, the routing device 130 sends the positioning information to the routing device 120 via Sock0, i.e. via the forwarding path of the server 110. The data content of the positioning information includes the following information:

{00:ff:7f:0a:81:6d, 42:21:1a:f4:ea:27, SMB, encrypted message (10.2.3.100 is at 42:21:1a:f4:ea:27)}

The routing device 120 determines that the routing device corresponding to the virtual IP address 10.2.3.100 is the routing device 130 by parsing the positioning message in the positioning information.

Meanwhile, the routing device 120 adds the routing device 130 to the connection list:

TABLE 4

Connection list of routing device 120

| Device | UDP connection method |
| --- | --- |
| ff:ff:ff:ff:ff:ff | Sock0 |
| 00:ff:7f:0a:81:6d | Sock0 |

Thereafter, the routing device 120 establishes the connection with the routing device 130 according to the positioning information. After the connection is established, the connection list of the routing device 120 and the routing device 130 is updated as:

TABLE 5

Connection list of routing device 120 after establishment of P2P connection

| Device | UDP connection method |
| --- | --- |
| ff:ff:ff:ff:ff:ff | Sock0 |
| 00:ff:7f:0a:81:6d | Sock1(P2P) |

TABLE 6

Connection list of routing device 130 after establishment of P2P connection

| Device | UDP connection method |
| --- | --- |
| ff:ff:ff:ff:ff:ff | Sock0 |
| 42:21:1a:f4:ea:27 | Sock1(P2P) |

The UDP connection method Sock1 indicates that the routing devices 120 and 130 are capable of exchanging data in the P2P way.

Figure 4:
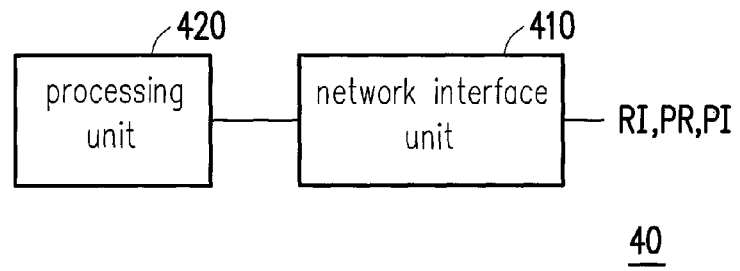
FIG. 4 is a block diagram of a routing device according to an embodiment of the invention.

The invention also provides a routing device adapted for a virtual private network communication system. FIG. 4 is a block diagram of a routing device according to an embodiment of the invention. Referring to FIG. 4, a routing device 40 includes a network interface unit 410 and a processing unit 420. The network interface unit 410 is connected to a server via the Internet. The processing unit 420 is coupled to the network interface unit 410 and transmits registration information RI to the server via the network interface unit 410, wherein the registration information RI includes a recognition string. The processing unit 420 further transmits a positioning request PR to the server via the network interface unit 410. The processing unit 420 receives positioning information PI from the server via the network interface unit 410, and the processing unit 420 directly connects to a remote routing device via the network interface unit 410 according to the positioning information PI and transmits data after the connection is established.

Details of the routing device 40 may be found in the descriptions of the embodiments of FIG. 1 to FIG. 3 and thus will not be repeated hereinafter. It should be noted that, when actually applied, the routing device 40 usually includes a sub-network interface unit (not shown) for connecting the hosts in the private network thereof (e.g. the private network 150 and the hosts 151-153 shown in FIG. 1) and exchanging data therebetween.

Figure 5:
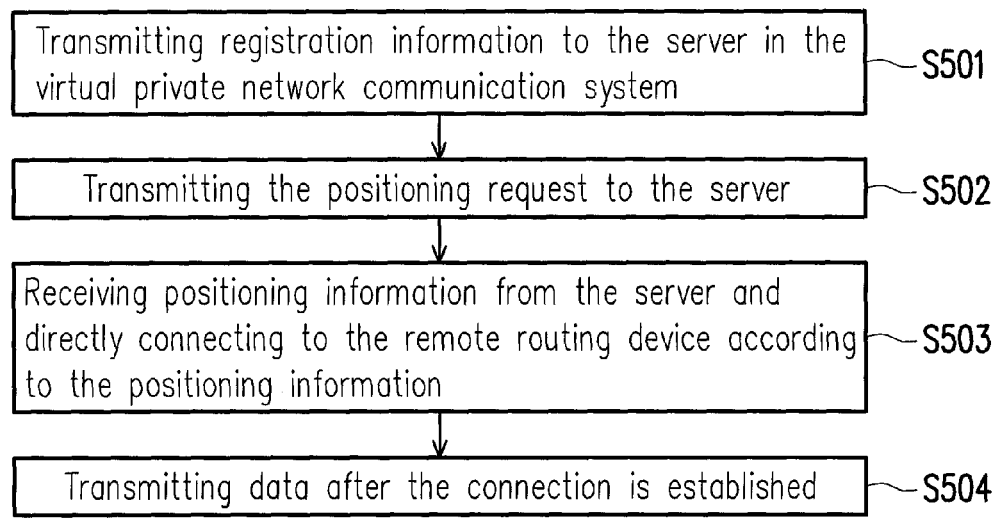
FIG. 5 is a flowchart illustrating a virtual private network communication method according to an embodiment of the invention.

The invention further provides a virtual private network communication method adapted for a routing device in a virtual private network communication system. FIG. 5 is a flowchart illustrating a virtual private network communication method according to an embodiment of the invention. Referring to FIG. 5, the virtual private network communication method includes the following steps. First, in Step S501, registration information is transmitted to a server in the virtual private network communication system, wherein the registration information includes a recognition string. Then, in Step S502, a positioning request is transmitted to the server. Next, in Step S503, positioning information is received from the server, and a remote routing device is directly connected according to the positioning information. Thereafter, in Step S504, data is transmitted after the connection is established. Details of the virtual private network communication method may be found in the descriptions of the embodiments of FIG. 1 to FIG. 3 and thus will not be repeated hereinafter.

In conclusion of the above, the invention provides a virtual private network communication system, a routing device, and a method thereof for performing operations, such as registration procedure, positioning procedure, and connection procedure, to complete the communication connection between the routing devices and private networks thereof in the virtual private network communication system. The system further utilizes a recognition string to distinguish virtual private network and positions the virtual IP address of the private network according to the positioning request and the recognition string included therein to achieve P2P transmission between two private networks. Even if the routing devices are both behind the NAT equipment, the connection of the virtual private network can still be established in a simple way. In addition, the recognition string can serve as the basis of the encrypted message to simplify the transmission of the key.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A virtual private network communication system, comprising:
   a server; and
   a plurality of routing devices respectively transmitting registration information to the server, wherein the registration information comprises a recognition string, and the recognition string corresponds to a virtual private network, the server obtains and stores the recognition string corresponding to each of the routing devices in response to receiving the registration information,
   wherein the routing devices comprise a first routing device and a second routing device, wherein the first routing device transmits a positioning request to the server, and the first routing device acquires positioning information having the MAC address of the second routing device, the positioning request comprises the recognition string of the first routing device and an address inquiry message,
   wherein the server transmits the positioning request to a part of or all of the routing devices according to the recognition string of the first routing device by broadcasting the positioning request to the routing devices having the same recognition string which is same as the recognition string of the first routing device,
   wherein when the second routing device receives the positioning request, the second routing device fills the MAC address of the second routing device in the positioning information and transmits the positioning information according to the positioning request to the first routing device via the server,
   wherein the first routing device directly establishes a connection with the second routing device according to the positioning information having the MAC address of the second routing device and transmits data after the connection is established,
   wherein the server stores the MAC address of each of the routing devices when the server receives the registration information transmitted by the routing devices, and the server determines that the routing devices having the same recognition string belong to the same virtual private network.

2. The virtual private network communication system according to claim 1, wherein:
   the registration information comprises a header and a data content, wherein the data content comprises the recognition string, a media access control (MAC) address of the server, and a MAC address of the routing device corresponding to the registration information.

3. The virtual private network communication system according to claim 2, wherein:
   when the server receives the positioning request from the first routing device, the server parses the positioning request and respectively transmits the positioning request to the routing devices with the same recognition string as the first routing device.

4. The virtual private network communication system according to claim 1, wherein:
   the positioning request transmitted by the first routing device comprises a header and a data content, wherein the data content comprises the recognition string, a MAC address of the first routing device, and an address inquiry message.

5. The virtual private network communication system according to claim 4, wherein:
   the address inquiry message is an encrypted message, comprising a virtual Internet protocol (IP) address.

6. The virtual private network communication system according to claim 4, wherein:
   the first routing device encrypts the address inquiry message according to the recognition string.

7. The virtual private network communication system according to claim 5, wherein:
   the second routing device transmits the positioning information to the first routing device via the server according to the MAC address of the first routing device in the positioning request when the second routing device parses the positioning request, decrypts the address inquiry message, and verifies that the virtual IP address in the address inquiry message is a virtual IP address in a private network of the second routing device.

8. The virtual private network communication system according to claim 1, wherein:
the first routing device connects to the second routing device according to the positioning information by a peer to peer (P2P) connection method when the first routing device receives the positioning information, wherein the P2P connection method is an encrypted connection.

9. A routing device, adapted for a virtual private network communication system comprising a server and another routing device, comprising:
a network interface unit connected to the server via an Internet; and
a processing unit coupled to the network interface unit and transmitting registration information to the server via the network interface unit, wherein the registration information comprises a recognition string, and the recognition string corresponds to a virtual private network, wherein the server obtains and stores the recognition string in response to receiving the registration information,
wherein the processing unit further transmits a positioning request via the network interface unit to the server and acquires positioning information having the MAC address of the another routing device, the positioning request comprises the recognition string of the routing device and an address inquiry message, the server broadcasts the positioning request to the another routing device having the same recognition string which is same as the recognition string of the routing device; and
wherein when the another routing device receives the positioning request, the another routing device fills the MAC address of the another routing device in the positioning information and transmits the positioning information according to the positioning request to the routing device via the server,
the processing unit receives the positioning information via the network interface unit in response to the positioning request, and the processing unit directly connects to the another routing device via the network interface unit according to the positioning information having the MAC address of the another routing device and transmits data after the connection is established,
wherein the another routing device having the same recognition string as the routing device belongs to the same virtual private network.

10. The routing device according to claim 9, wherein:
the registration information comprises a header and a data content, wherein the data content comprises the recognition string, a MAC address of the server, and a MAC address of the routing device.

11. The routing device according to claim 9, wherein:
the positioning request comprises a header and a data content, wherein the data content comprises the recognition string, the MAC address of the routing device, and an address inquiry message.

12. The routing device according to claim 9, wherein:
the address inquiry message is an encrypted message, comprising a virtual IP address.

13. The routing device according to claim 12, wherein:
the processing unit encrypts the address inquiry message according to the recognition string.

14. The routing device according to claim 9, wherein:
when the processing unit receives the positioning information, the processing unit connects to the another routing device via the network interface unit according to the positioning information by a P2P connection method, wherein the P2P connection method is an encrypted connection.

15. A virtual private network communication method adapted for a routing device in a virtual private network communication system, the virtual private network communication method comprising:
transmitting, by the routing device, registration information to a server in the virtual private network communication system, wherein the registration information comprises a recognition string, and the recognition string corresponds to a virtual private network, wherein the server obtains and stores the recognition string in response to receiving the registration information;
transmitting, by the routing device, a positioning request to the server and acquiring, by the routing device, positioning information having the MAC address of another routing device, wherein the positioning request comprises the recognition string of the routing device and an address inquiry message, wherein the server broadcasts the positioning request to the another routing device having the same recognition string which is same as the recognition string of the routing device,
wherein when the another routing device receives the positioning request, the another routing device fills the MAC address of the another routing device in the positioning information and transmits the positioning information according to the positioning request to the routing device via the server;
receiving, by the routing device, the positioning information having the MAC address of the another routing device from the server and directly connecting to the another routing device according to the positioning information; and
transmitting data after the connection is established,
wherein the another routing device having the same recognition string as the routing device belongs to the same virtual private network.

16. The virtual private network communication method according to claim 15, wherein:
the registration information comprises a header and a data content, wherein the data content comprises the recognition string, a MAC address of the server, and a MAC address of the routing device corresponding to the registration information.

17. The virtual private network communication method according to claim 15, wherein:
the positioning request comprises a header and a data content, wherein the data content comprises the recognition string, the MAC address of the routing device, and an address inquiry message.

18. The virtual private network communication method according to claim 15, wherein:
the address inquiry message is an encrypted message comprising an Internet protocol (IP) address.

19. The virtual private network communication method according to claim 18, wherein a step before transmitting the positioning request comprises:
encrypting the address inquiry message according to the recognition string.

20. The virtual private network communication method according to claim 18, comprising:
connecting to the another routing device according to the positioning information by a P2P connection method when receiving the positioning information, wherein the P2P connection method is an encrypted connection.

* * * * *